(12) United States Patent
Tsosie

(10) Patent No.: US 12,263,786 B1
(45) Date of Patent: Apr. 1, 2025

(54) VEHICLE MOUNTED REFLECTIVE BANNER

(71) Applicant: Rogerson Tsosie, Albuquerque, NM (US)

(72) Inventor: Rogerson Tsosie, Albuquerque, NM (US)

( * ) Notice: Subject to any disclaimer, the term of this patent is extended or adjusted under 35 U.S.C. 154(b) by 126 days.

(21) Appl. No.: 17/989,501

(22) Filed: Nov. 17, 2022

(51) Int. Cl.
| G09F 13/16 | (2006.01) |
| B60Q 1/30 | (2006.01) |
| B60Q 1/32 | (2006.01) |
| B60Q 7/00 | (2006.01) |

(52) U.S. Cl.
CPC .............. B60Q 7/005 (2013.01); B60Q 1/302 (2013.01); B60Q 1/32 (2013.01); G09F 13/16 (2013.01)

(58) Field of Classification Search
CPC ............. G09F 13/0463; G09F 13/0468; G09F 13/0472; G09F 13/16; G09F 21/04; G09F 21/041; G09F 21/048; G09F 21/0485; G09F 2007/122; G09F 2007/12; G09F 7/18; G09F 2007/1852; G09F 2007/1865; G09F 2007/1886; G09F 2017/0033; G09F 15/0025; G09F 15/0062; G09F 17/00; B60Q 7/005; B60Q 1/302; B60Q 1/32
See application file for complete search history.

(56) References Cited

U.S. PATENT DOCUMENTS

| 4,937,962 A * | 7/1990 | Hornblad ................ G09F 17/00 40/604 |
| 5,016,372 A * | 5/1991 | Gold ....................... G09F 21/04 40/604 |
| 5,076,196 A | 12/1991 | Chan |
| 5,263,272 A | 11/1993 | Fogelman |
| 5,398,437 A * | 3/1995 | Bump, Jr. ............. B60Q 1/503 40/604 |
| 6,598,558 B2 * | 7/2003 | Griffin .................... G09F 17/00 116/173 |
| 7,117,619 B1 * | 10/2006 | Huber ..................... G09F 11/04 40/604 |
| 9,795,848 B1 * | 10/2017 | Fairchild .............. A63B 57/357 |
| 10,529,257 B1 * | 1/2020 | Peelgrane ................ G09F 3/02 |
| 2003/0217685 A1 * | 11/2003 | Aldridge ................ G09F 17/00 116/173 |
| 2006/0112601 A1 * | 6/2006 | Childress ............... G09F 17/00 40/541 |
| 2006/0162643 A1 * | 7/2006 | Aasgaard ................ B60Q 7/00 116/28 R |

* cited by examiner

*Primary Examiner* — Cassandra Davis
(74) *Attorney, Agent, or Firm* — Sanchelima & Associates, P.A.; Jesus Sanchelima; Christian Sanchelima

(57) ABSTRACT

A vehicle mounted reflective banner to a vehicle including a front assembly, a rear assembly, and an attaching assembly. The front assembly is made of a reflective material and has a triangle warning signal. The rear assembly is made of vinyl and has a triangle warning signal. The front assembly and the rear assembly are sewn together. The attaching assembly includes magnets, eyelets, and fasteners. The fasteners are introduced in the eyelets to fix said vehicle mounted reflective banner to a vehicle to a vehicle. The magnets are sewn in the front assembly and in the rear assembly. The magnets are used to attach the vehicle mounted reflective banner to a vehicle.

9 Claims, 4 Drawing Sheets

VEHICLE MOUNTED REFLECTIVE BANNER

BACKGROUND OF THE INVENTION

1. Field of the Invention

The present invention relates to a vehicle mounted reflective banner and, more particularly, to a vehicle mounted reflective banner that is fixed to vehicles to be used as a warning device.

2. Description of the Related Art

Several designs for a vehicle mounted reflective banner have been designed in the past. None of them, however, include metal eyelets to fix the banner using fasteners or suction cups.

Applicant believes that a related reference corresponds to U.S. Pat. No. 5,076,196 issued for a mat that is configured to be displayed on the rear of a vehicle and includes multiple strips of reflective material to improve the visibility of roadside vehicle. Applicant believes that another related reference corresponds to U.S. Pat. No. 5,263,272 issued for a foldable emergency sign for a vehicle that includes a reflective triangle. None of these references, however, teach of an emergency roadside vehicle banner comprising a rectangular sign that is formed of a reflective waterproof material, wherein the corners include metal eyelets for mounting the banner to a vehicle via variety of fasteners.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle mounted reflective banner that includes magnets to fix the banner to metal surfaces.

It is another object of this invention to provide a vehicle mounted reflective banner that includes brass eyelets which can use suction cups with hook to mount the banner onto glass or fiberglass.

It is still another object of the present invention to provide a vehicle mounted reflective banner that includes a reflective material with a red triangular caution sign in the middle of the rear side and front side of the banner.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1A:
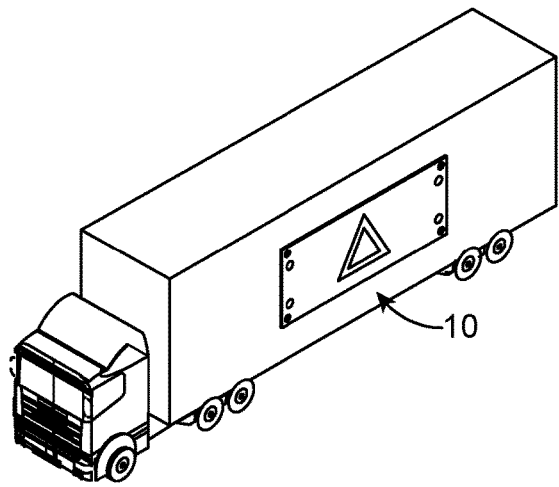
FIG. 1A-FIG. 1D represent isometric operational views of the present invention 10 attached to different parts of vehicles.
Figure 1B:
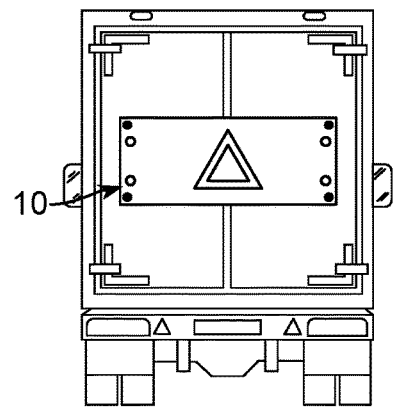
Figure 1C:
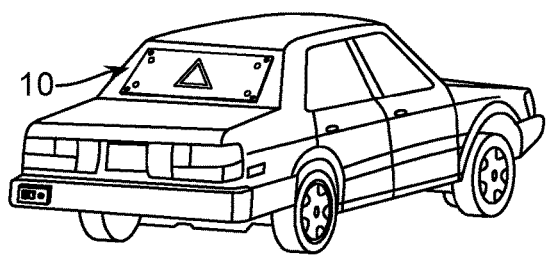
Figure 1D:
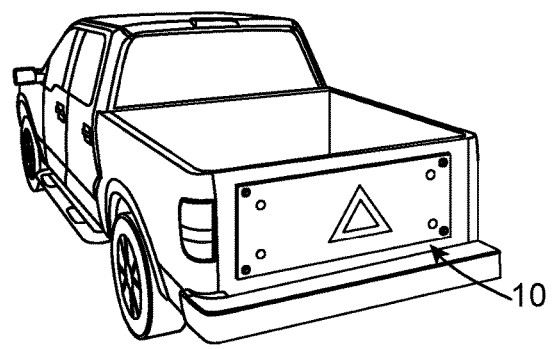

Referring now to the drawings, where the present invention is generally referred to with numeral 10, it can be observed that it basically includes a front assembly 20, a rear assembly 40 and an attaching assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
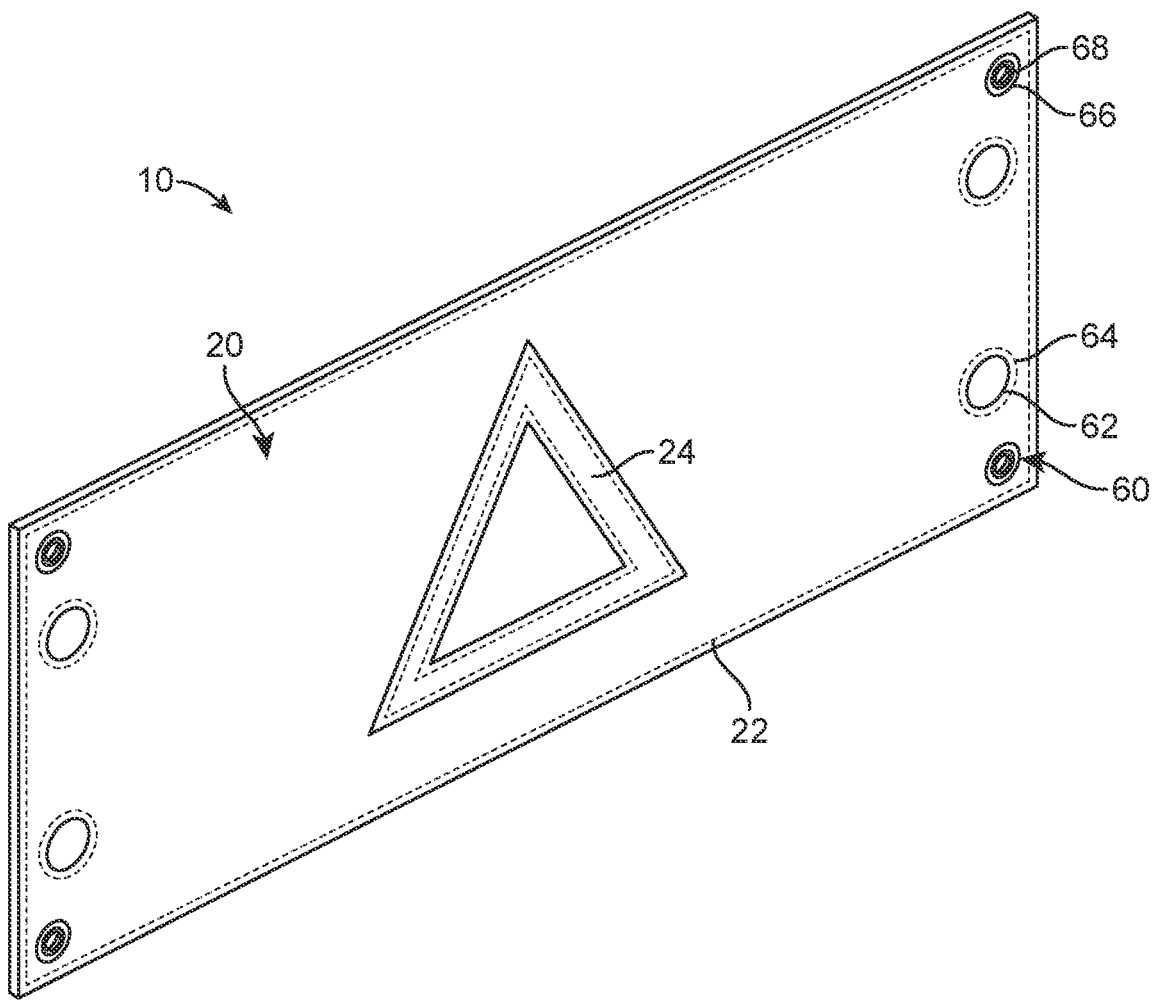
FIG. 2 shows an isometric view of the present invention 10 showing the front assembly 20 and the attaching assembly 60.
Figure 3:
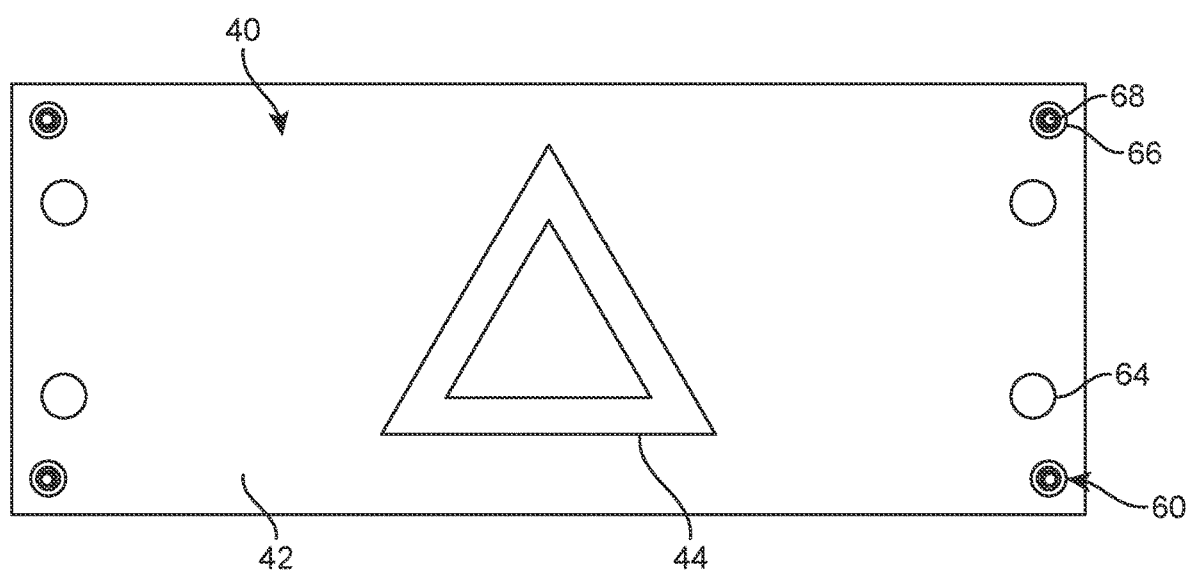
FIG. 3 illustrates a rear view of the present invention 10. The present invention further includes a rear assembly 40.

Referring to FIG. 2, the front assembly 20 may include a front banner 22 and a first caution sign 24. The front banner 22 may have a rectangular shape. It also may be suitable for the front banner 22 to have a circular shape, a triangular shape, or any other suitable shape. The front banner 22 may be made of micro prismatic reflective vinyl. It also may be suitable for the front banner 22 to be made of neon reflective fabric, biaxially-oriented polyethylene terephthalate or any other reflective material. The front banner 22 may be waterproof. The front banner 22 may be planar. The front banner 22 may have a first caution sign 24.

In a preferred embodiment the first caution sign 24 is a red triangular caution sign. The first caution sign 24 may be in a front central portion of the front banner 22. It also may be suitable for the first caution sign 24 to have any other configuration in the front of the front banner 22. The first caution sign 24 may be made of micro prismatic reflective vinyl. It also may be suitable for the first caution sign 24 to be made of neon reflective fabric, biaxially-oriented polyethylene terephthalate or any other reflective material. The first caution sign 24 may be waterproof. The front assembly 20 may be attached to the rear assembly 40.

The rear assembly 40 may include a rear banner 42 and a second caution sign 44. The rear banner 42 may have a rectangular shape. It also may be suitable for the rear banner 42 to have a circular shape, a triangular shape, or any other suitable shape. In a preferred embodiment the rear banner 42 may be made of vinyl. It also may be suitable for the rear banner 42 to be made of cotton, metal, leather, plastics, or any other suitable material. The rear banner 42 may be waterproof. The rear banner 42 may be planar. The rear banner 42 may have a second caution sign 44.

In a preferred embodiment the second caution sign 44 is a red triangular caution sign. The second caution sign 44 may be in a central front portion of the rear banner 42. It also may be suitable for the second caution sign 44 to have any other configuration in the front of the rear banner 42. The second caution sign 44 may be made of micro prismatic reflective vinyl. It also may be suitable for the second caution sign 44 to be made of neon reflective fabric, biaxially-oriented polyethylene terephthalate or any other reflective material. The second caution sign 44 may be waterproof.

The attaching assembly 60 may include magnets 62, seam 64, eyelets 66 and fasteners 68. The magnets 62 may be located on the left and right side of a central portion of the front banner 22 and the rear banner 42. The magnets 62 may have a circular shape. It also may be suitable for the magnets 62 to have a rectangular shape, a triangular shape, or any other suitable shape. The magnets 62 may be made of neodymium iron boron (NdFeB), samarium cobalt (SmCo), or any other suitable material. The magnets 62 may be used to fix the present invention 10 to a metallic surface. The magnets 62 may be fixed in the front banner 22 and the rear banner 42 through seam 64. The front assembly 20 and the rear assembly 40 may be attached together through the seam 64.

Figure 4:
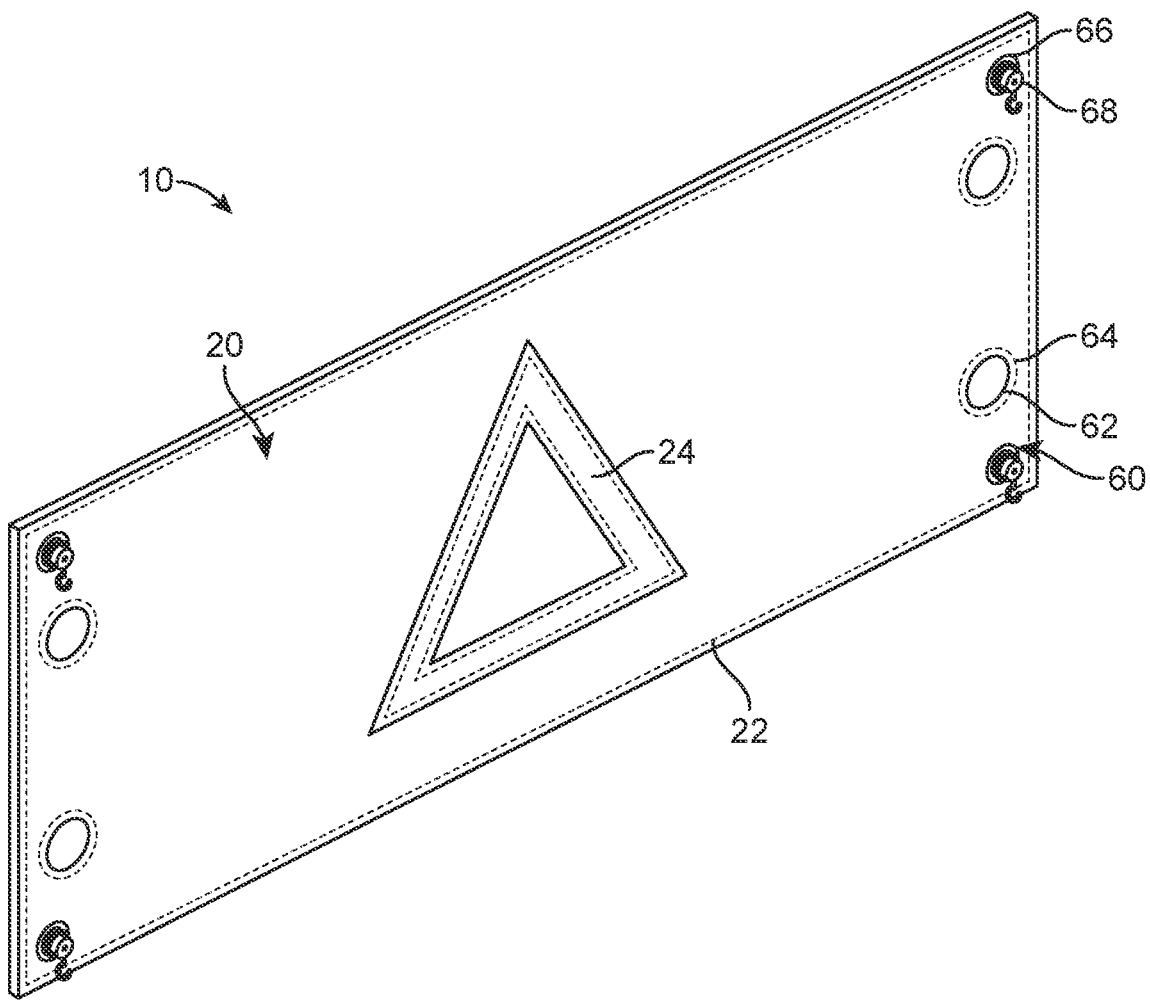
FIG. 4 is a representation of an isometric view of an alternative embodiment of the present invention 10 wherein the attaching assembly includes suction cups 68.

The eyelets 66 may be rounded metallic rings. It also may be suitable for the eyelets to have a rectangular shape, a triangular shape, or any other suitable shape. The eyelets 66 may be inserted into openings that go through the front banner 22 and the rear banner 42. The eyelets 66 may be located on the corners of the front banner 22 and the rear banner 42. In a preferred embodiment the fasteners 68 may be inserted through said eyelets to fix the present invention 10 to a surface such a car. In one embodiment the fasteners 68 are screws, as shown in FIG. 2. In this embodiment the invention 10 is attached to a surface by inserting the fasteners 68 in that surface. In an alternative embodiment the fasteners 68 are suction cups as shown in FIG. 4. The suction cups may adhere the present invention to a glass surface. In a preferred embodiment the present invention 10 may be attached to a vehicle through the magnets and secured using the fasteners 68. The present invention 10 may be reversible having the front banner 22 being reflective and the rear banner 42 being no reflective. A user may choose to use the front banner 22 or the rear banner 42 and secure it to a vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vehicle mounted reflective banner, comprising:
   a front assembly, wherein said front assembly includes a front banner and a first warning signal, said first warning signal is a reflective front banner;
   a rear assembly, wherein said rear assembly includes a rear banner and a second warning signal, said rear banner is a vinyl banner, said front assembly and said rear assembly are sewn together; and
   an attaching assembly, wherein said attaching assembly includes eyelets, and fasteners, said fasteners are introduced into said eyelets to mount said mounted reflective banner to a vehicle.

2. The vehicle mounted reflective banner set forth in claim 1, wherein said attaching assembly includes magnets, said magnets are sewn in said front banner and said rear banner.

3. The vehicle mounted reflective banner set forth in claim 2, wherein said magnets are configured to mount said vehicle mounted reflective banner to a metallic surface.

4. The vehicle mounted reflective banner set forth in claim 1, wherein said first warning signal and said second warning signal are red triangular warning signals.

5. The vehicle mounted reflective banner set forth in claim 1, wherein said reflective front banner is made of micro prismatic reflective vinyl.

6. The vehicle mounted reflective banner set forth in claim 1, wherein said front banner and said rear banner have a rectangular shape.

7. The vehicle mounted reflective banner set forth in claim 1, wherein said eyelets are four eyelets located in corners of the front banner and the rear banner.

8. A vehicle mounted reflective banner, comprising:
   a front assembly, wherein said front assembly includes a front banner and a first warning signal, said first warning signal is a reflective front banner;
   a rear assembly, wherein said rear assembly includes a rear banner and a second warning signal, said first warning signal and said second warning signal are red triangular warning signals, said rear banner is a vinyl banner, said front assembly and said rear assembly are sewn together, said front banner, and said rear banner ha a rectangular shape; and
   an attaching assembly, wherein said attaching assembly includes eyelets, and fasteners, said fasteners are introduced into said eyelets to mount said mounted reflective banner to a vehicle, said eyelets are four eyelets located in corners of the front banner and the rear banner.

9. A vehicle mounted reflective banner, consisting of:
   a front assembly, wherein said front assembly includes a front banner and a first warning signal, said first warning signal is a reflective front banner, said reflective front banner is made of micro prismatic reflective vinyl;
   a rear assembly, wherein said rear assembly includes a rear banner and a second warning signal, said first warning signal and said second warning signal are red triangular warning signals, said rear banner is a vinyl banner, said front assembly and said rear assembly are sewn together, said front banner, and said rear banner has a rectangular shape; and
   an attaching assembly, wherein said attaching assembly includes eyelets, magnets, and fasteners, said fasteners are introduced into said eyelets to mount said mounted reflective banner to a vehicle, said eyelets are four eyelets located the corners of the front banner and the rear banner, said magnets are sewn in said front banner and said rear banner, said magnets are configured to mount said vehicle mounted reflective banner to a metallic surface.

\* \* \* \* \*